Figure 3:
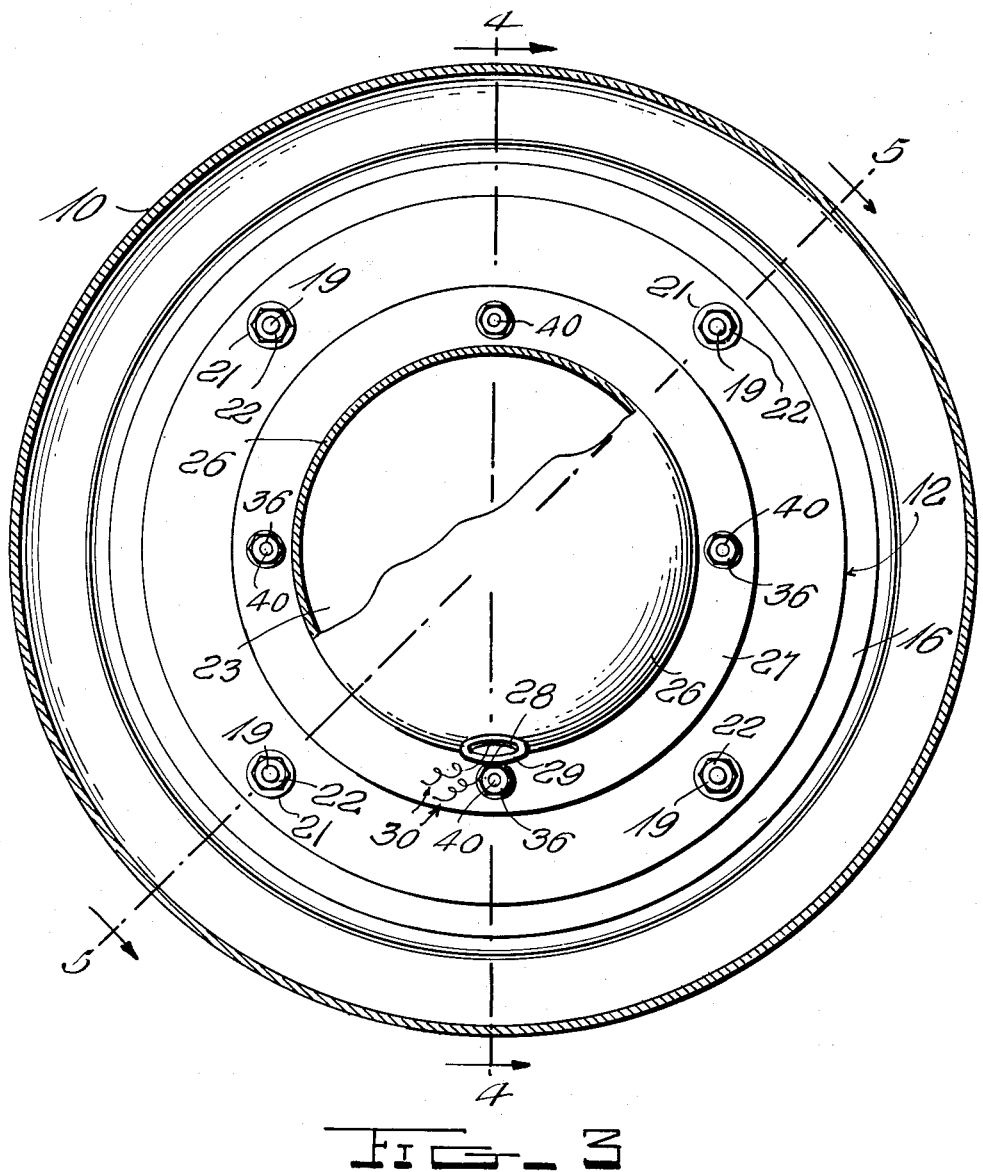

May 8, 1956  A. ARNEJO  2,744,999
MOUNTING FOR VEHICLE HEADLIGHTS
Filed July 21, 1954  3 Sheets-Sheet 1
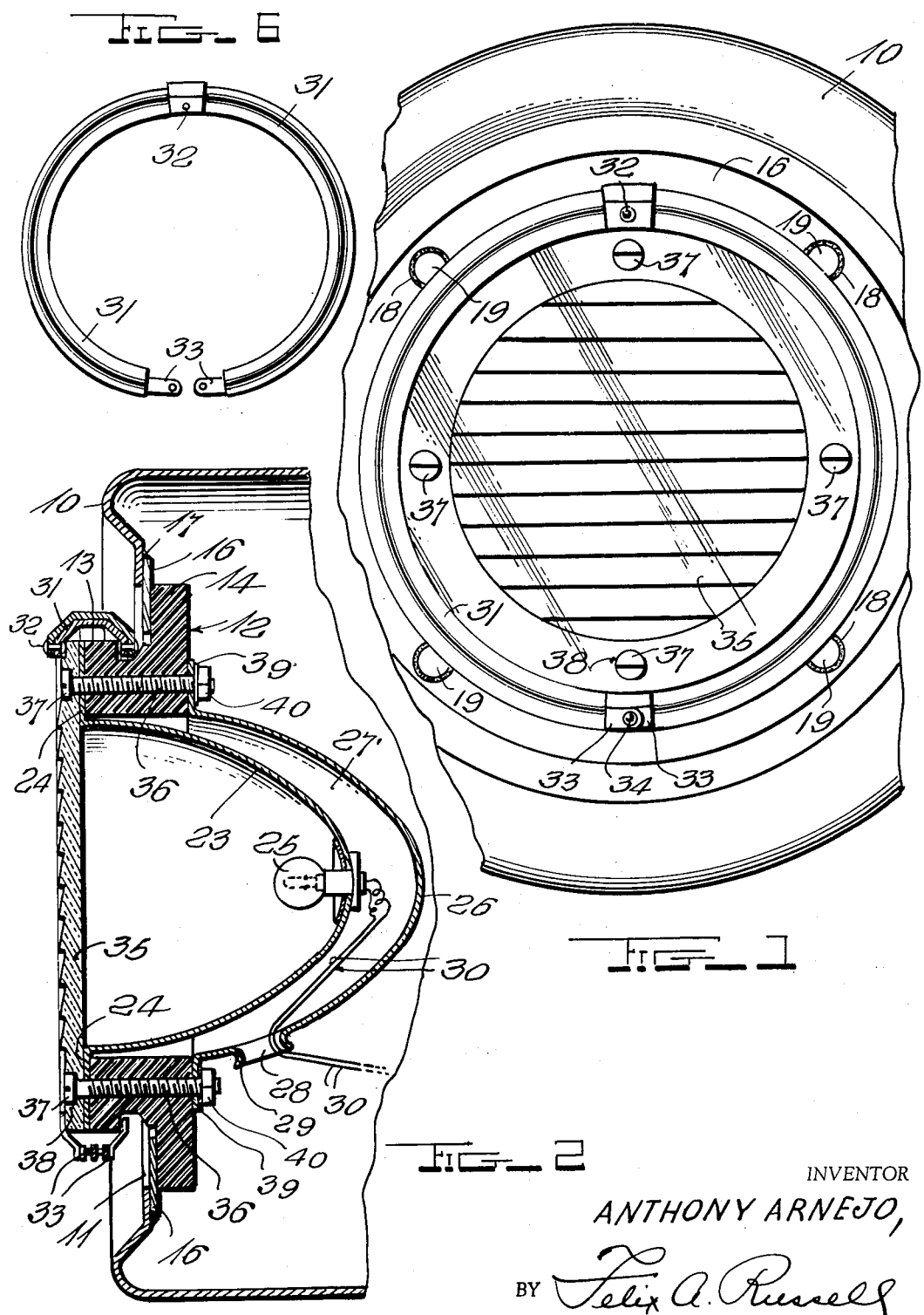
INVENTOR
ANTHONY ARNEJO,
BY Felix A. Russell
ATTORNEY

INVENTOR
ANTHONY ARNEJO,
ATTORNEY

May 8, 1956     A. ARNEJO     2,744,999
MOUNTING FOR VEHICLE HEADLIGHTS
Filed July 21, 1954     3 Sheets-Sheet 3
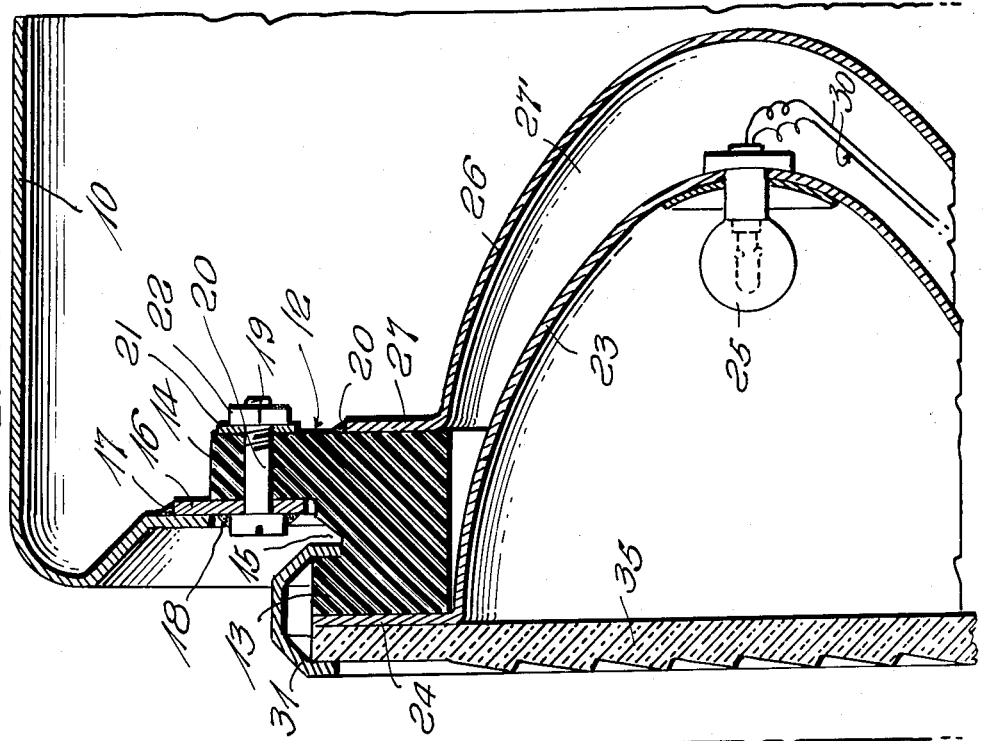
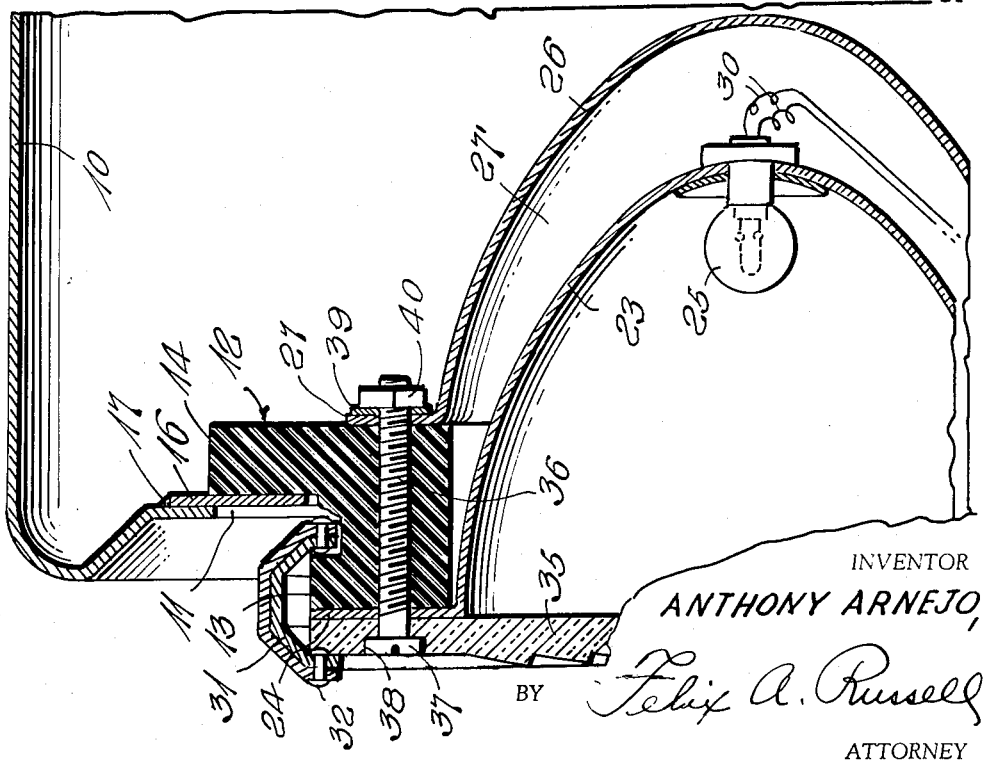
INVENTOR
ANTHONY ARNEJO,
BY
ATTORNEY United States Patent Office 2,744,999
Patented May 8, 1956

2,744,999

MOUNTING FOR VEHICLE HEADLIGHTS

Anthony Arnejo, Detroit, Mich.

Application July 21, 1954, Serial No. 444,728

4 Claims. (Cl. 240—8.1)

The present invention relates to an improved mounting for vehicle headlights and it consists in the combinations, constructions and arrangements of parts herein described and claimed.

Generally the present invention relates to an improved mounting for vehicle headlights which is an improvement over my former application Serial No. 361,180 filed on June 12, 1953. The device involves an automobile headlight structure having novel means whereby the same may be quickly and easily mounted upon an automobile with a minimum of effort.

It is accordingly an object of the invention to provide a device of the character set forth which is simple in construction, inexpensive to manufacture and yet effective and efficient in use.

Another object of the invention is to provide a novel plastic ring forming a part of the invention.

Still another object of the invention is the provision of a device of the character set forth which may be assembled from a position wholly from the inner side of a vehicle fender.

Other and further objects of the invention will become apparent from a reading of the following specification taken in conjunction with the drawings, in which:

Figure 1 is a fragmentary front elevational view of an embodiment of the invention, Figure 2 is a vertical sectional view, somewhat reduced, of the device illustrated in Figure 1, Figure 3 is a rear elevational view, partly in section and partly broken away, of the device as illustrated in Figures 1 and 2, Figure 4 is a fragmentary sectional view, somewhat enlarged, taken along line 4—4 of Figure 3, Figure 5 is a fragmentary sectional view, somewhat enlarged, taken along line 5—5 of Figure 3, and Figure 6 is a reduced elevational view of a decorative rim forming a part of the invention.

Referring more particularly to the drawings, there is shown therein a vehicle fender 10 having a headlight receiving opening 11 therein. A ring 12 of plastic material is provided with a front portion 13 of relatively small diameter and a rear portion 14 of relatively large diameter. An annular groove 15 is provided in the outer face of the ring 12 between the portions 13 and 14 thereof.

A flat metal ring 16 is welded, as indicated at 17, to the inner side of the fender 10 to the peripheral portion of the fender about the opening 11.

Extending inwardly through the ring 16 with their heads welded to the ring 16, as indicated at 18, is a plurality of circumferentially spaced bolts 19. The larger portion 14 of the plastic ring 12 is provided with openings 20 for the reception therethrough of the bolts 19 and the latter are each provided with a washer 21 and nut 22.

A reflector 23 is provided with an annular outwardly extending flange 24 at its forward end and a lamp 25 is mounted in conventional manner in the rearward end thereof. A housing 26 is likewise provided with an outwardly extending annular flange 27 and is so mounted rearwardly of the reflector 23 as to provide a space 27' therebetween. An opening 28 is centrally provided in the lower portion of the housing 26 and is provided with an outwardly flaring lip 29. Lead wires 30 extend from the lamp 25 through the space 27 and thence through the opening 28 to a source of electrical energy (not shown).

A two part ornamental metal rim 31 is centrally hinged, as indicated at 32. The free ends of the rim 31 are each provided with an apertured ear 33' whereby the same may be interconnected with a fastener element 34 when the device is in operative position, as shown, for example, in Figure 1.

A lens 35 is positioned in abutment with the forward face of the flange 24 and a plurality of bolts 36 extend through the lens, the flange 24, the plastic ring 12 and the flange 27. The bolts 36 are arranged in circumferentially spaced relation to each other and at points radially midway between the bolts 19. Each of the bolts 36 is provided with a head at its forward end, as indicated at 37, which head lies within a countersunk opening 38 in the lens 35 and each of the bolts 36 is provided at its rearward end with a washer 39 and nut 40.

In assembling the device of the present invention, the metal ring 16 is first welded into place upon the rear peripheral portion bordering the opening 11 with the bolts 19 already welded in place. Thereafter it is only necessary to take the completely assembled headlight with the exception of the ornamental rim 31 and move it forwardly from within the fender 10 in such manner that the bolts 19 may extend through the openings 20 whereupon the workman need only place the washers 21 and nuts 22 upon the bolts 19. Thereafter the ornamental rim 31 may be quickly and easily mounted upon the headlight from the outer side of the fender 10, it being apparent that the sides of the ornamental rim 31 will extend into the groove 15 and against the forward side of the lens 35, respectively. It will also be apparent that the lip 29, being outwardly curved as shown, for example, in Figure 2, will prevent the lead wires 30 from becoming frayed or cut by vibration or other causes.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination with an automobile fender having a headlight receiving opening therein, the provision of a flat metal ring affixed to the inner face of the peripheral portion of said headlight-receiving opening, a headlight construction comprising an annular ring having a plurality of circumferentially spaced holes therethrough, an enlarged rear portion for said ring having a plurality of circumferentially spaced openings therethrough, said annular ring having a circumferentially extending groove in the outer periphery thereof adjacent said enlarged portion, a reflector having a flange at the forward end thereof abutting the forward side of said annular ring, a lens abutting the flange of said reflector, said lens and said flange having openings registering with the openings in said annular ring, a lamp housing rearwardly of said reflector, a flange at the forward end of said housing, bolts extending through the registering openings in said lens, annular ring and said flanges, a nut for each of said bolts, a plurality of bolts affixed to the metal ring and extending rearwardly therefrom and through the openings in said enlarged portion, and a nut for each of said last-mentioned bolts.

2. A device as defined in claim 1 wherein said annular ring is formed of a plastic material.

3. A device as defined in claim 1 wherein a lead-wire receiving opening is formed in the lower portion of said lamp housing, said opening having an outwardly flaring lip.

4. A device as defined in claim 1 wherein an ornamental ring encompasses said lens, said reflector flange and the unenlarged portion of said annular ring, the rearward portion of said ornamental ring being positioned in said groove.

References Cited in the file of this patent

UNITED STATES PATENTS

| | | |
|---|---|---|
| 2,114,350 | Lee | Apr. 19, 1938 |
| 2,284,538 | Parkes | May 26, 1942 |

FOREIGN PATENTS

| | | |
|---|---|---|
| 823,587 | France | 1938 |